United States Patent Office 3,534,228
Patented Oct. 13, 1970

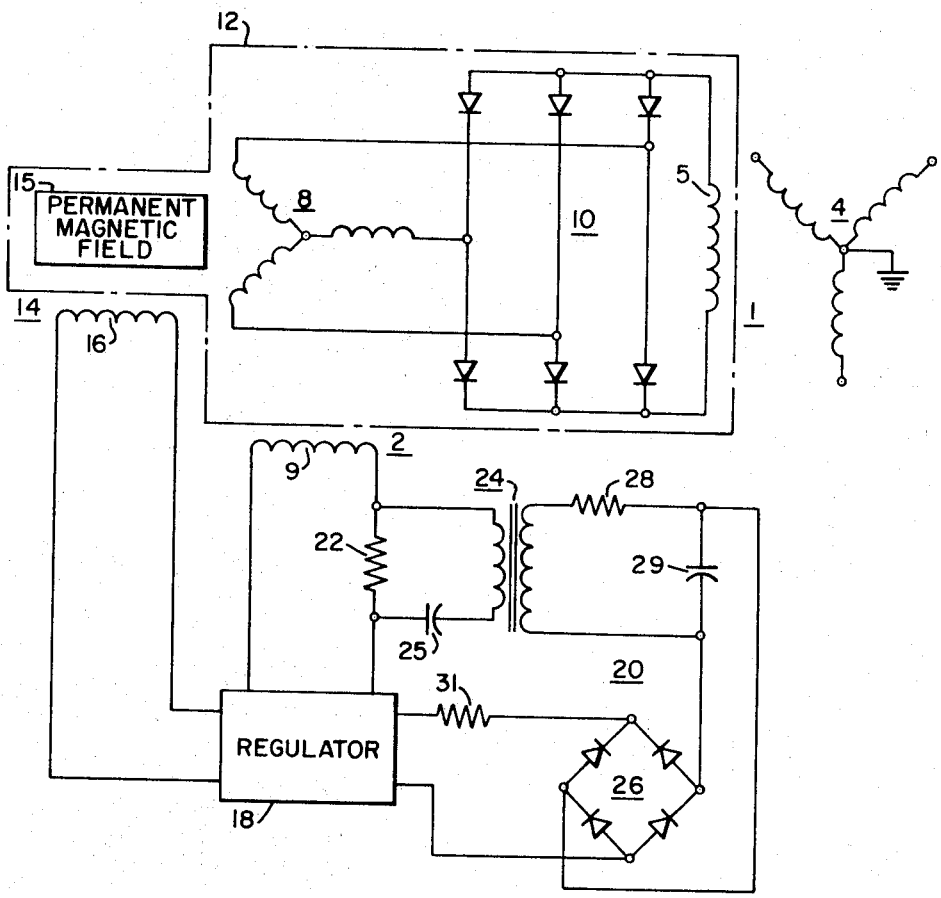

3,534,228
GENERATOR AND EXCITER PROTECTION CIRCUIT
Wayne E. Hyvarinen and John C. Olliver, Lima, Ohio, assignors to Westinghouse Electric Corporation, Pittsburgh, Pa., a corporation of Pennsylvania
Filed May 8, 1968, Ser. No. 727,410
Int. Cl. H02h 7/06
U.S. Cl. 317—13     6 Claims

ABSTRACT OF THE DISCLOSURE

The invention comprises a protection circuit for exciters and alternating current generators. The circuit includes a resistor, a capacitor and a small voltage transformer connected in the circuit of the exciter field to sense the magnitude of the alternating current therein and to develop an error voltage proportional thereto, and a diode circuit for rectifying said voltage and for providing a reference voltage. The circuit produces a signal effective to interrupt or control the magnitude of the exciter field current when the magnitude of the error voltage exceeds that of the reference voltage.

BACKGROUND OF THE INVENTION

The present invention relates to alternating current generators of the brushless type, and particularly to the protection of such generators against certain faults in the excitation system.

Alternating current synchronous generators of the brushless type are supplied with field excitation from an alternating current exciter and a rotating rectifier assembly. In such generator systems, the main generator has armature windings on the stator and a field winding on the rotor. A main alternating current exciter is provided which has its field winding on the stator and its armature winding on a rotor which is carried on the same shaft as the rotor of the main generator, or is otherwise mounted for rotation with the generator rotor. A rotating rectifier assembly is also mounted on the same shaft, for rotation with the generator and exciter rotors, and is electrically connected between the exciter armature winding and the generator field winding. The stationary exciter field winding is supplied with direct current excitation from any suitable source, which may be independent of the main generator, such as a pilot exciter. In this way, a generator system is provided which requires no commutator or slip rings, and no brushes or sliding contacts.

Experience has shown that the rectifiers in the rotating assembly normally fail in the shorted mode rather than in the open mode. This type of failure (shorted) causes short circuit current to flow in the main exciter armature circuit and windings during portions of the exciter output cycle. The magnitude of these short circuit currents is a function of the exciter constants and the level of excitation applied to the stationary exciter field. Continuous operation of the main exciter with a shorted rectifier at a high excitation level would cause excessive heating of the exciter with its eventual destruction, and possible damage to the main generator. Generator damage occurs when the exciter end turns overheat and deteriorate the end turn banding, the end turns coming loose when the banding gives way. The banding and end turns then rub against the end turns of the generator stator winding. The pilot exciter and regulator would also be operating above normal voltage and current levels with a shorted rectifier.

Generally, the main exciter is a three-phase alternating current machine so that with a shorted rectifier, the armature demagnetizing ampere turns are oscillating at the exciter frequency. Magnetic flux changes in the exciter field cannot follow the change in the demagnetizing ampere turns so that the ampere turns of the exciter field will oscillate to maintain the constant relationship between total effective ampere turns and the magnetic flux.

The magnitude of average exciter field amperes or current required for a particular output from the rotating rectifier assembly increases with a shorted rectifier when compared to normal operation. With a full wave rectifier circuit the excitation required essentially doubles when a rectifier shorts; with a half wave rectifier circuit this factor is approximately four.

In U.S. Pat. 3,210,603 issued to W. Calfee et al. on Oct. 5, 1965 and assigned to the present assignee, there is shown and described a circuit arrangement for protecting generators and generator exciters from certain types of faults, for example, faults caused by failure of one or more of the rectifiers in the rectifier assembly or by insulation failure in the exciter armature windings. The patented arrangement includes a current transformer connected in the circuit of the exciter field winding for sensing increases in exciter field current oscillations due to faults of the nature mentioned above. The current transformer was further effective to isolate the direct current component of the field current from the alternating current component, but the design of the current transformer was critical since the transformer was biased with direct current, the direct current bias level being equal to the average exciter field amperes. This direct current bias required a heavy, more costly transformer than would be required for the alternating current component only.

In addition to the current transformer, the patented arrangement required a Zener diode to develop a reference voltage to provide the error signal required for interrupting exciter field excitation.

BRIEF SUMMARY OF THE INVENTION

The present disclosure provides a low cost, light weight and reliable circuit for sensing the occurrence of a shorted rectifier and limiting exciter field current to an acceptable level so that the system can continue to operate without causing further damage to the exciter and the generator. An acceptable level of exciter field current is a level that would limit the effective armature current with a shorted rectifier to the same level as would occur with a normal system operating at rated load.

Broadly, this is accomplished by using a simple, stock-item resistor to sense oscillatory and excessive exciter field currents and to develop an error voltage signal in response thereto, a standard voltage transformer to amplify the voltage and provide signal isolation, and a diode circuit using ordinary diodes to rectify and simultaneously provide a reference voltage for comparison with said voltage signal. When the voltage signal exceeds the reference, i.e., the forward drop or breakover voltage of the diodes, current flows to means for interrupting or limiting the excitation voltage applied to the main exciter field.

In this manner, light weight, low cost, standard components are employed to effect reliable protection for a main exciter and its associated main generator. This is of particular importance in electrical power systems for aircraft where weight, size and reliability are vital concerns.

THE DRAWING

The invention, along with its objects and advantages, will become more apparent from the following detailed description read in connection with the accompanying drawing in which the sole figure is a schematic diagram showing an illustrative embodiment of the invention.

PREFERRED EMBODIMENT

Specifically, there is shown in the figure, a typical embodiment of the invention as applied to the protection of a brushless generator 1 and a main exciter 2. The generator 1 may be of any suitable or usual construction having a three phase armature winding 4 forming part of a stator structure not shown, and a field winding 5 carried on a rotor member not shown.

The exciter 2 is an alternating current machine and is depicted as having a three phase armature winding 8 carried on a rotor member (not shown) of the machine, and a stationary field winding 9 disposed on a stator structure (not shown) of the machine.

The exciter armature winding 8 is electrically connected to a rectifier assembly 10 which is shown as a three-phase full-wave rectifier bridge though any suitable rectifier circuit may be used. The rectifier assembly is connected between the exciter armature windings 8 and the generator field winding 5 to supply direct current excitation to said winding in a manner presently to be explained.

The rotor of the exciter 2 which carries the armature winding 8 and the rectifier assembly 10, and the generator rotor which carries the field winding 5 are mounted together on a common shaft or otherwise mechanically connected for rotation on a common rotating member, as indicated by the dot-dash outline 12.

The exciter field winding 9 is provided with direct current excitation from a suitable direct current source which is shown diagrammatically in the figure as a pilot exciter 14. The pilot exciter may, for example, comprise a permanent magnet field member 15 driven from the main generator shaft and electromagnetically related to a stationary armature winding 16 electrically connected to a regulator 18 so that pilot voltage is applied to the regulator when the shaft or member 12 is rotated.

The regulator 18 is suitably designed and constructed to control the voltage (usually DC) applied to the stationary field winding 9 of the main exciter 2. This control may be based upon the voltage output of the main generator 1 or other information fed back to the regulator 18, the regulator functioning to vary the main exciter field current to maintain generator output voltage constant. This typical brushless system provides a synchronous alternating current generator with direct current excitation without the use of commutators, slip rings or brushes.

As previously explained, such a generator and main exciter must be protected against fault currents occurring with a shorted rectifier in the rectifier assembly 10. If and when a rectifier fails in the shorted mode, an intermittent or pulsating short circuit occurs across the exciter armature windings 8. The magnitude of the short-circuit current is dependent on exciter field excitation. If the excitation of the exciter field winding 9 is not limited or interrupted, the short-circuit current will cause excessive heating in the main exciter armature resulting in serious damage to the exciter 2 and the generator 1.

In a system such as that shown in the drawing and described above, in which excitation is supplied by a pilot exciter, the exciter field excitation is independent of the main generator voltage so that excitation is maintained under failed rectifier conditions through normal operation of the regulator 18.

In accordance with the invention, a protective circuit 20 is provided for detecting the occurrence of a shorted rectifier in the rectifier assembly 10 and for immediately reducing the level of excitation in the exciter 2. In the operation of an alternating current machine such as the exciter 2, the armature reaction due to the current in the armature winding is reflected across the air gap and produces an alternating current ripple superimposed on the direct current in the field winding 9 circuit. In normal operation, this ripple component of the field current has a frequency which is equal to six times the frequency of the exciter voltage with a three-phase full-wave rectifier circuit such as that shown, or three times the exciter frequency for a three-phase half-wave rectifier circuit. When a rectifier shorts in the rectifier assembly an oscillation of field amperes occurs at the exciter frequency. This oscillation is considerably greater than the normal exciter field ampere ripple.

This change in the characteristics of the ripple component of the exciter field current is utilized for detecting the occurrence of a shorted rectifier. For this purpose, the protective circuit 20 includes a resistor 22, serially connected in the circiut of the main exciter field winding 9, and the primary circuit of a voltage transformer 24 connected across the resistor as shown. The transformer primary circuit includes further a capacitor 25 serially connected therein.

The secondary of the transformer 24 is connected to a diode circuit 26 through a simple filter circuit comprised of a resistor 28 and a capacitor 29. The resistor 28 represents the total resistance of the transformer reflected to the secondary plus any additional resistance required to obtain the desired filter characteristics.

The diode circuit 26 is shown connected to the regulator 18, through a current limiting resistor 31, for effecting control of the regulator 18 in a manner presently to be explained through the invention is not limited thereto. For example, the diode circuit output could be employed to effect complete interruption of the field current as shown and described in the above-mentioned Calfee et al. patent.

In operation of the protective circuit 20 thus far described, the resistor 22 develops a voltage signal proportional to exciter field amperes, the resistance value of 22 being small in comparison to that of the exciter field circuits. The developed voltage is applied to the series combination of the transformer 24 primary and the capacitor 25, said capacitor functioning to isolate the DC component in the field circuit from the AC component. The capacitance value of 25 is such that its electrical impedance at the exciter frequency is small in comparison to the equivalent input impedance to the transformer 24.

At this juncture, it may be pointed out that the voltage transformer 24 is not biased with the exciter field DC component as is the case with the current transformer employed in the protective circuit disclosed in the above-mentioned Calfee et al. patent. Thus, the transformer in the present invention need not be large and heavy in order to avoid saturation thereby effecting an immediate savings in cost, space and weight.

The transformer 24 performs two functions in the protective circuit 20, namely, the electrical isolation of the voltage signal developed by the resistor 22 from the direct current supply (not shown) of the regulator 18, and the amplification of said voltage signal to a desired level.

The combination of the resistor 28 and the capacitor 29 forms a simple filter for a double generator frequency component which occurs with unbalanced loads and faults on the generator 1. Unbalanced loads and faults occurring on the generator armature winding 4 are reflected in the generator field winding 5 in the manner of a field current oscillating at double generator frequency which presents an oscillating load on the main exciter 2 at the same double frequency. This oscillating load is, in turn, reflected in the exciter field winding 9 and its associated circuit. The resistor 28 and capacitor 29 are effective to attenuate this double frequency component, if and when it occurs, to an acceptable level.

The filtered voltage, which is an alternating current voltage, is applied to the diode circuit 26 which functions to rectify said voltage while simultaneously providing a reference voltage to which the filtered voltage is compared. The reference voltage is simply the breakover or firing potential required to render the diodes 26 conductive. When the voltage across the diodes attains this potential, the diodes conduct to apply an error signal to the regulator 18.

The error signal is developed when one or more of the rectifiers in the rotating assembly 10 fail in a shorted mode. When this occurs there is an immediate increase in the average of the main exciter field DC current, said current having an oscillating component with the total current flowing through the resistor 22. The resistor 22 develops a voltage signal in proportion to the total current. The DC component is blocked by the capacitor 25 and the major portion of the oscillating voltage applied to the transformer primary. When amplified by the transformer 24, the signal is sufficient to overcome the forward drop or voltage breakover point of the diodes 26 as explained. The diodes apply a pulsating direct current error signal to the regulator 18 to reduce the excitation current supplied to the field winding 9 to an acceptable level, such a level being that which would limit current in the armature winding 8 to the same level as would occur with normal operation (i.e., without a shorted rectifier) at rated load.

The regulator 18 may be of the type shown and described in U.S. Pat. 3,170,109 issued to J. L. Roof on Feb. 16, 1965 and assigned to the present assignee. In said patent, a preamplifying, switching transistor is employed to control the "on" time of the regulator which determines the level or magnitude of excitation voltage to the field winding of the exciter. The switching of the transistor is effected by a basic voltage error signal, developed when the output voltage of the generator 1 differs from that of a reference voltage, the basic error signal being applied between the base and emitter of the transistor.

In the present disclosure the output signal from the diode circuit 26 may be similarly applied between the base and emitter of such a transistor to override the basic voltage error signal and thereby turn the regulator 18 off during those time periods the pulsating short circuit current in the circuit of the field winding 9 is effective to produce the error signal.

In operation of the protective circuit 20, the error signal produced thereby will drop to zero two times during each exciter cycle. When the signal level is below the forward drop characteristic of the diodes 26 and the base to emitter drop of the switching transistor in the regulator 18, the regulator will be on. When the signal level rises above said drop characteristics, the regulator is turned off.

During normal operation of the system, the error signal developed by the protective circuit 20 remains negligible so that control of the regulator 18 is effected only by the feedback information from the main generator, for example.

Thus, in the embodiment of the invention described, the protective circuit 20 is effective to limit exciter field ampere oscillations, and hence average exciter field amperes, using a small number of standard, light weight and inexpensive components. This prevents further exciter and/or generator damage if a rectifier in the rotating assembly 10 fails, and this is accomplished economically and with little weight penalty.

Although only one embodiment of the invention has been shown it will be obvious to those skilled in the art that the invention is not so limited, but is susceptible to various other changes without departing from the spirit thereof.

What is claimed is:
1. In an excitation system for an alternating current generator having a stationary armature and a rotating field winding,
   an exciter having a stationary field winding and an armature winding rotatable with said generator field winding,
   rectifier means mounted for rotation with said generator field and exciter armature windings, and electrically connected therebetween, said rectifier means being effective to supply direct current excitation to said generator field winding,
   means for supplying direct current to said exciter field winding,
   a sensing means directly conductively coupled to said exciter field winding to sense the magnitude of exciter field winding current oscillation, said sensing means including means to isolate DC from AC voltages and to produce an AC error voltage in proportion to said field winding current oscillation,
   means for producing a reference voltage, and
   means for limiting said exciter field winding current when the magnitude of the error voltage exceeds that of the reference voltage.
2. The system recited in claim 1 in which the means for limiting the exciter field current includes a regulator connected to control the magnitude of exciter field excitation,
   the voltage sensing means being connected to said regulator to change the regulator output and thus the level of field excitation when the magnitude of the error voltage exceeds that of the reference voltage.
3. The system recited in claim 1 in which the voltage sensing means includes a resistance means and a voltage transformer, the transformer having its primary winding connected across the resistance means.
4. The system recited in claim 1 in which the voltage sensing means includes a voltage transformer having its primary winding connected in the circuit of the exciter field,
   the means for producing the reference voltage comprising a diode circuit, and
   the secondary winding of said transformer being connected to said diode circuit.
5. The system recited in claim 1 further comprising means to rectify said AC error voltage and for comparing said rectified error voltage with said reference voltage.
6. The system recited in claim 5 wherein a diode bridge comprises both said means to rectify and said means for producing a reference voltage.

References Cited
UNITED STATES PATENTS 3,210,603 10/1965 Calfee et al. _____ 317—13
3,351,845 11/1967 Root et al. _____ 322—28 X ORIS L. RADER, Primary Examiner H. HUBERFELD, Assistant Examiner U.S. Cl. X.R.
322—28, 59